A. BLOCH.
PARLIAMENTARY GUIDE.
APPLICATION FILED JULY 22, 1916.

1,258,861.

Patented Mar. 12, 1918.
2 SHEETS—SHEET 1.

PRINCIPAL MOTIONS

PRIVILEGED

1-Fix time to adjourn.§10
2-To adjourn.§11
3-Question of privilege.§12
4-Orders of the day.§13

INCIDENTAL

5-Appeal.§14
6-Objection to consideration of question §15
7-Reading of papers.§16
8-Withdrawal of motion.§17
9-Suspension of rules.§18

SECONDARY

10-Lay on the table.§19
11-Previous question.§20
12-Postpone to a certain time.§21
13-Commit or refer.§22
14-Amend or substitute.§23
15-Postpone indefinitely§24

MISCELLANEOUS MOTIONS

16-To rescind.§25
17-Renewal of a motion.§26
18-Reconsideration of a debatable question.§27
19-Reconsideration of an undebatable question§27
20-To take from the table.§19
21-To limit the debate.§37
22-To make a special order.§13
23-To take up question out of its proper order.§44
24-To grant leave to continue speaking after indecorum §36
25-To close debate or to extend limits of debate(Same ruling as No. 21) §37
26-To rise(in committee, equals adjourn.Same ruling as No. 2)§11

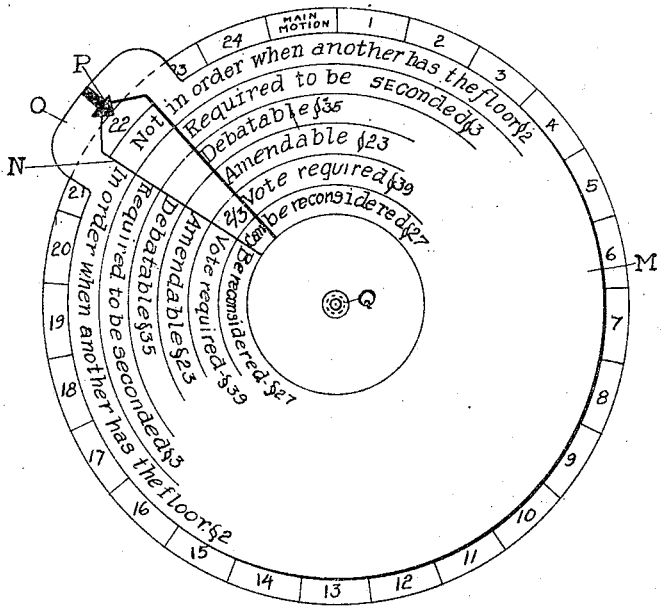

SPECIAL RULES (A) Not debatable if made when another question is pending.
(B) Undebatable only when relating to indecorum, or if made while the previous question is pending.
(C) The objection can only be made when the question is first introduced, before debate.
(D) An affirmative vote on this motion cannot be reconsidered.
(E) Allows but limited debate upon the propriety of postponement.
(F) Opens main question to debate.
(G) To amend rules requires 2-3rds vote.
(H) An amendment can be amended only once.
(J) Can be moved and entered on the record when another has the floor, but cannot interrupt business before the assembly; must be made on the day, or the day after the original vote was taken, and by one who voted with the prevailing side.

Fig. 1

Inventor: Adolph Bloch
By Joseph ——— Attorney

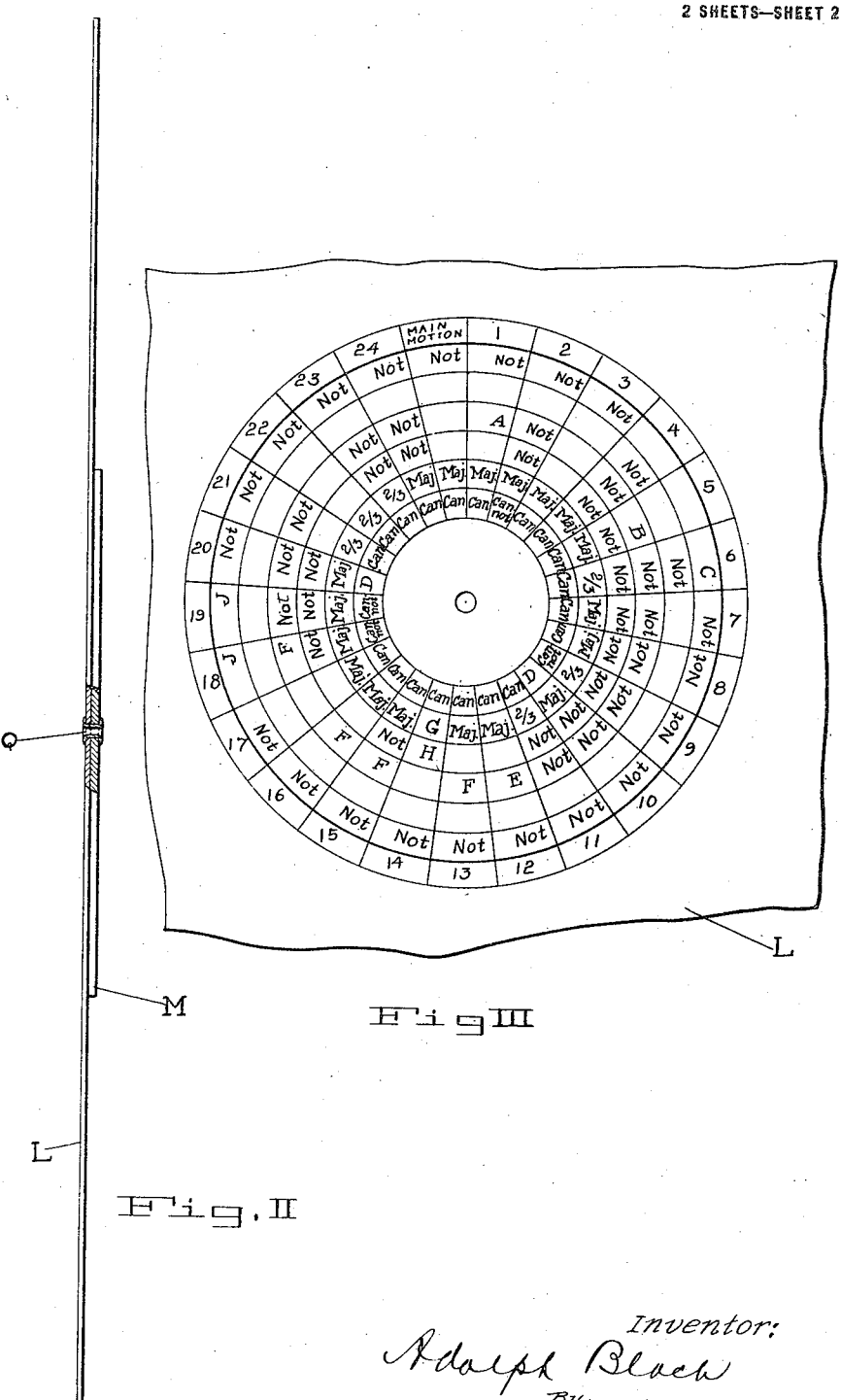

UNITED STATES PATENT OFFICE.

ADOLPH BLOCH, OF PORTLAND, OREGON.

PARLIAMENTARY GUIDE.

1,258,861.  Specification of Letters Patent.  Patented Mar. 12, 1918.

Application filed July 22, 1916.  Serial No. 110,669.

*To all whom it may concern:*

Be it known that I, ADOLPH BLOCH, a citizen of the United States of America, residing at Portland, in the county of Multnomah, in the State of Oregon, have invented a certain new and useful Parliamentary Guide, of which the following is a specification, reference being had to the accompanying drawings.

My invention relates to means for determining the application of the rules of parliamentary law, and has for its object the production of a device which will enable any one of ordinary intelligence to read at sight the proper ruling upon any question which may arise in the course of debate.

While my device is specially valuable to a presiding officer in enabling him to rule promptly and unerringly during the heat of debate, it may be used to advantage likewise by any one on the floor.

What constitutes my invention will be hereinafter specified in detail and succinctly set forth in the appended claims.

In the accompanying drawings,

Figure I is a front elevation of my invention complete in present preferred form of embodiment.

Fig. II is an edge view of the same.

Fig. III is a view of a portion of the board of my device with the movable member removed.

Referring to the reference characters on the drawings, L indicates a board or sheet upon which is displayed as shown in Fig. III a cut or representation of a dial. The dial is divided by lines printed or otherwise displayed upon its face into any preferred number of sectors or subdivisions.

The several subdivisions or sectors as shown are indicated by numerals 1 to 24 in a marginal zone of the dial. Twenty-five sectors are shown in the drawings. The twenty-fifth sector may be designated by its appropriate numeral, but for distinction I prefer to give it the name "Main motion" as shown in the drawings.

The marginal zone of the dial has been designated. Concentric therewith is indicated by lines a plurality of other or inner zones, six being the number preferred as shown in Fig. III.

Within the minor subdivision of each sector made by the intersections therewith of the zone-defining lines, is presented a blank, a word or abreviation of a word, a letter, a numeral or other reference character. Such matter as is displayed in the said minor subdivisions of the several sectors appears in the drawings and need not be described in detail. The matter displayed in each sector or subdivision is indexed by the numeral or name in the marginal zone for a reason which will be presently made apparent.

Upon the board L a disk M is pivotally secured by means, for example, of a hollow rivet Q. The outside diameter of the disk M is enough less than that of the dial shown in Fig. III to legibly expose the characters borne in the marginal zone of said dial (see Fig. I). In consequence, the numerals of said marginal zone serve the important purpose of an index for indicating at all times to the eye of a reader the display contents of each sector on the dial whether it be as the majority of them always is partially concealed by the disk M or not.

The disk M is provided with a single aperture N which being perferably sector-shaped, corresponds in its shape and dimensions to the uniform shape and dimensions of the various subdivisions displayed on the dial. Consequently the presence of the aperture N in the disk M affords means for reading the subdivisions of the face of the dial, one by one, through the disk as it is revolved upon its pivot Q above the face of the dial.

The aperture N is preferably bounded upon its outer side by a bridge O which preferably projects beyond the periphery of the dial as shown in Fig. I. Its purpose is to strengthen the disk and to afford means for the display of an index dart P which, for each adjustment of the disk M, points to the marginal number of the particular subdivision presented through the aperture N to the eye of the reader.

The face of the disk M is preferably laid out in lines which register with those which define the inner zones on the dial and between them is displayed, as in print, certain matter such as words or phrases which, read with the word presented upon the sector of the dial made visible through the aperture N, constitute in each instance the ruling proper to be made.

The words and phrases above referred to are preferably displayed in reverse order on the face of the disk upon the opposite sides of the aperture N. Also the characters in the subdivisions of each sector upon the dial are displayed as shown in Fig. III—those above the horizontal being footed toward the center of the dial and those below the horizontal being reversed. By the arrangement described in this paragraph it is made easy to read the rulings presented in any position to which the disk M is rotated.

The numerals displayed in the marginal zone of the dial are included in consecutive order in a list of "Motions" displayed, preferably as shown in Fig. I, upon the board L.

Another list of "Special rules" is also preferably displayed upon the board in which they also are designated, respectively, by reference characters, such, for distinction from the numerals of the list first mentioned, as letters of the alphabet arranged in consecutive order.

The board L, provided with the dial and revolving disk M as described, together with lists as indicated, afford ready means for reading at sight the rulings that apply to any motion which may be presented.

In operation, for example, suppose the disk M is set as shown in Fig. I to expose the sector 22. Upon reference to the list of "Motions" the motion indicated therein by the reference character 22 will be found to be a motion "to make a special order."

As appears directly from the reading of the matter on the disk M and on the sector or subdivision 22 made visible through the aperture N in the disk by the rotation of the disk that motion is "not in order when another has the floor"; is "required to be seconded"; is "debatable"; is "amendable"; "$\frac{2}{3}$ vote required"; and "can be reconsidered."

The special rules are indicated severally by letters in certain sectors to which they apply, and appear at large upon the face of the board opposite the letter of indication under the list of "Special rules."

It will be apparent from the foregoing that reference may be made to the "lists" aforesaid from the figures of the marginal index zone of the dial or from the letters as they appear in the subdivisions of the dial as in the example above given, or that reference may be made from the figures of the list to those of the dial upon proper manipulation of the disk M.

The section ( ) numbers which appear in the list of "Motions" refer, in the example presented, to "*Roberts' Rules of Order,*" but may be made to refer to any other book of that kind that may be adopted by preference.

What I claim is:

1. In a device of the kind described, the combination with a sheet having displayed thereon a dial provided with subdivisions, of a revoluble disk concentric with the dial provided with a single aperture of shape and dimensions corresponding to those of the said subdivisions, said subdivisions and disk, respectively, displaying complementary characters, words and phrases which the rotation of the disk is adapted to bring into proper relative assemblage, and means upon the dial for indicating at all times to the eye of a reader the location of each of said subdivisions.

2. In a device of the kind described, the combination with a sheet having displayed thereon a dial provided with sector-shaped subdivisions, of a revoluble disk concentric to the dial provided with an aperture of shape and dimensions corresponding to those of the said subdivisions, a marginal zone upon the dial displayed about the periphery of the disk and having distinguishing characters one for each subdivision of the dial, and a bridge bounding the outer side of said aperture.

3. In a device of the kind described, the combination with a sheet having lists displayed upon its face, each item of said lists being identified by an appropriate reference character, of a dial upon the sheet provided with subdivisions respectively designated by characters corresponding, respectively, to the characters on said lists, a movable member upon the dial provided with an aperture of shape and dimensions corresponding to those of said subdivisions whereby the movement of said member renders said subdivisions visible one by one, said movable member displaying, adjacent to said aperture, words or phrases, the subdivisions of the dial displaying matter complementary to said words or phrases.

4. In a device of the kind described, the combination with a sheet provided with a dial divided into a plurality of sectors, and with a separate designation for each sector, of a revoluble disk surmounting the dial and provided with an aperture corresponding to each sector on the disk, the disk displaying a series of words or phrases that are adapted to be read with matter displayed upon each of the several sectors, the rotation of the disk rendering possible different readings from the dial and the disk according to selection made from among the number of the sectors by their several designations.

In testimony whereof, I have hereunto set my hand in the presence of two subscribing witnesses.

ADOLPH BLOCH.

Witnesses:
HOWARD O. ROGERS,
MABEL NEVILLE.